United States Patent [19]

Allen et al.

[11] Patent Number: 5,405,171
[45] Date of Patent: Apr. 11, 1995

[54] DUAL GASKET LINED PIPE CONNECTOR

[75] Inventors: William C. Allen, Pasadena; William M. Rickard, Palm Desert; Daniel P. Hoyer, Santa Rosa, all of Calif.; David E. Stikkers, Reno, Nev.; Matthew L. Kelley, Windsor, Calif.

[73] Assignee: Union Oil Company of California, Los Angeles, Calif.

[21] Appl. No.: 68,770

[22] Filed: Jun. 1, 1993

Related U.S. Application Data

[60] Continuation-in-part of Ser. No. 713,551, Jun. 7, 1991, Pat. No. 5,236,231, and Ser. No. 753,612, Aug. 30, 1991, Pat. No. 5,240,293, which is a division of Ser. No. 427,758, Oct. 26, 1989, Pat. No. 5,069,485, and a continuation of Ser. No. 713,551, Oct. 26, 1989, which is a continuation of Ser. No. 427,758, Oct. 26, 1989.

[51] Int. Cl.⁶ .............................................. F16L 9/14
[52] U.S. Cl. ................................. 285/55; 285/355; 285/352; 285/910
[58] Field of Search ............... 285/910, 351, 352, 55, 285/332.4, 333, 334, 355

[56] References Cited

U.S. PATENT DOCUMENTS

| | | | |
|---|---|---|---|
| 2,805,872 | 9/1957 | Routn | 285/910 |
| 3,142,499 | 7/1964 | Lang | 285/352 |
| 3,284,106 | 11/1966 | McIntosh | 285/352 |
| 3,427,050 | 2/1969 | Krieg | 285/355 |
| 3,472,533 | 10/1969 | Turner | 285/355 |
| 3,596,931 | 8/1971 | Mishler | 285/355 |
| 4,373,750 | 2/1983 | Mantelle | 285/55 |
| 4,883,292 | 11/1989 | Kuroki | 285/55 |

FOREIGN PATENT DOCUMENTS

| | | | |
|---|---|---|---|
| 1012904 | 7/1952 | France | 285/352 |
| 2242630 | 3/1975 | France | 285/352 |
| 737770 | 9/1955 | United Kingdom | 285/112 |

OTHER PUBLICATIONS

Recommended Practice for Application of Cement Lining to Steel Tubular Goods, Handling, Installation and Joining, API Recommended Practice 10E (RP 10E), Second Ed. Jul. 1, 1987. pp. 1-23.
Material Specification, American Variseal, Broomfield, Colo., 2 pages.
Product DataSheet Lucite Superflex 596, High Temperature (600° F.)/Low Volatile-Industrial Grade-Silicone Adhesive/Sealant, Formula No. 596, Sep. '83, 2 pages.
How to Design with Gaskets, 4 pages.
Why is Calgraph Flexible Graphite a superior gasket material? 3 pages.
A New Way to Seal Gasket Surfaces That are Out-of-Flat, 5 pages.

*Primary Examiner*—Eric K. Nicholson
*Attorney, Agent, or Firm*—William O. Jacobson; Gregory F. Wirzbicki

[57] ABSTRACT

A multi-piece, pipe joint seal has a slidable interface between seal pieces. The slidable interface allows for slippage between pieces during pipe joint assembly and disassembly, minimizing rotational and other stresses on the seal pieces and pipe sealing surfaces which may damage or endanger the deformable seal. The slidable interface seal is especially useful for joining brittle-lined pipe sections handling harsh fluids.

24 Claims, 2 Drawing Sheets

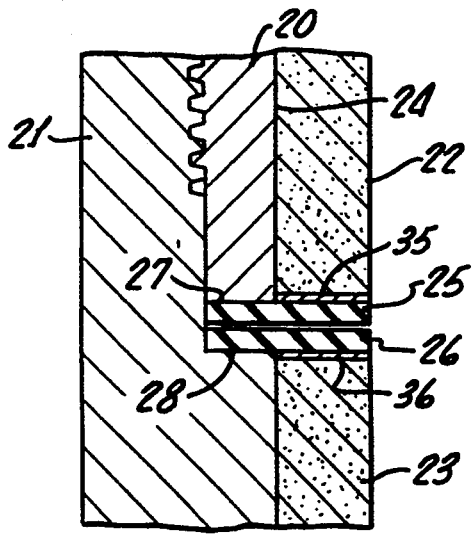
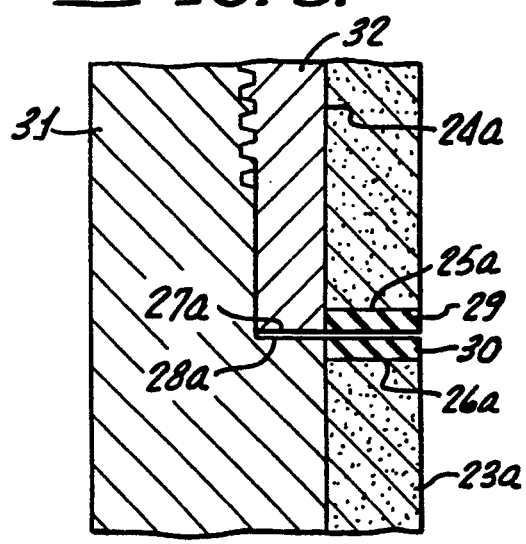
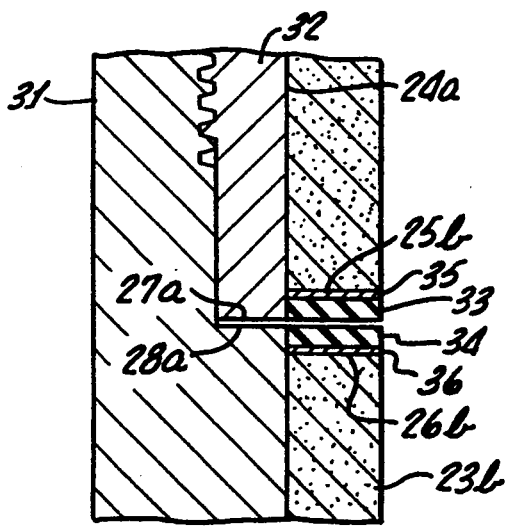
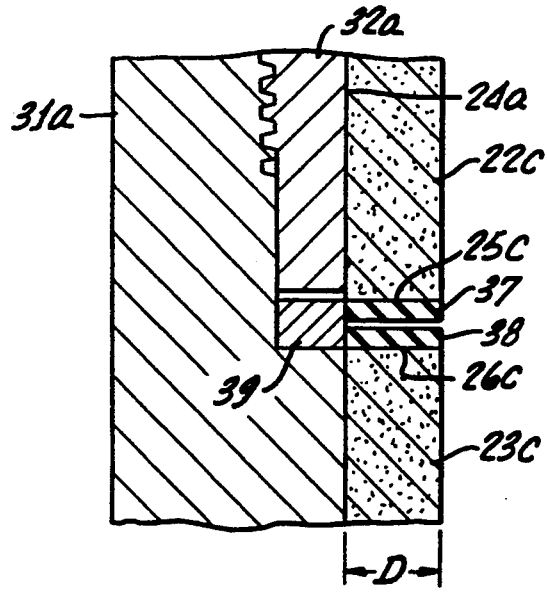

DUAL GASKET LINED PIPE CONNECTOR

CLAIMS FOR PRIORITY, INCORPORATION BY REFERENCE

This application is a continuation-in-part of: (1) copending application Ser. No. 07/713,551, filed Jun. 7, 1991 now U.S. Pat. No. 5,236,231, which is a continuation of application Ser. No. 07/427,758, filed Oct. 26, 1989, now U.S. Pat. No. 5,069,485, issued on Dec. 3, 1991; and (2) application Ser. No. 07/753,612, filed on Aug. 30, 1991, now U.S. Pat. No. 5,240,293, issued on Aug. 31, 1993 which is a continuation of application Ser. Nos. 07/713,551, filed Jun. 7, 1991, and a division of application Ser. No. 07/427,758, filed Oct. 26, 1989, now U.S. Pat. No. 5,069,485, issued on Dec. 3, 1991. All of these prior filed applications are incorporated in their entirety herein by reference.

FIELD OF THE INVENTION

This invention relates to piping systems having a brittle liner for containing harsh fluids. More specifically, the invention is concerned with sealing lined pipe connectors.

BACKGROUND OF THE INVENTION

Many piping system applications in petro-chemical and other industries involve the handling of corrosive, erosive, scaling or otherwise hard-to-handle fluids. Piping materials that can withstand these fluids can be very costly. One economic approach to handling these difficult fluids is to cover or to line the interior of low cost (non-fluid-resistant) piping with a liner which is fluid-resistant. The low-cost pipe material, such as carbon steel, provides cost-effective structural support for the fluid resistant, but less structurally adequate liner. Even when a liner is composed of fluid resistant materials, more severe applications (such as handling erosive geothermal fluids) tend to erode, chip, spall, crack, pit, and delaminate the lining material, requiring thicker liners. Thin liners may also experience coverage and tool damage problems. One type of cost effective thick liner is composed of a fluid resistant, but brittle material, such as cement.

Lined-pipe connectors typically have a primary seal at a structural interface and a secondary liner seal at a liner interface to prevent fluid from contacting non-fluid-resistant piping materials. The added liner seal must also be reliable since exposure of the non-fluid-resistant pipe material to the harsh fluids can cause piping failure even if the primary seal does not leak.

Some connectors having significantly loaded liner gaskets or seals satisfy the need for a reliable liner seal, but significantly loaded liner seals may not be practical for fragile or brittle liners. In addition, liner sealing surface preparations needed (e.g., machining) can impose other unacceptable demands on the brittle liner, resulting in damage to the brittle liner and failure at the piping joint.

One type of soft elastomeric liner seal, such as an O-ring, also typically requires a groove or retaining edge to be provided in the liner end surface. In addition to loading and anchoring the elastomeric material, the groove can provide space for seal distortion isolated from the fluid stream flow.

However, this type of seal tends to require smoother sealing surfaces and tighter tolerances (e.g., on the groove depth) when compared to gasket type seals. But reliably obtaining these finishes and tolerances for a cast cement liner sealing surfaces may not be feasible, even if machined after casing. Grooves may also concentrate stresses in a brittle liner.

Creating a reliable liner end seal is particularly challenging when a threaded connector is used. The sealing element must be compressed while at the same time be able to accept relative rotation of the joint elements (e.g., during threaded joint assembly). Since typical soft elastomeric materials used for seals, such as synthetic rubbers, also tend to adhere to sealing surfaces and have a relatively high coefficient of friction without lubrication, rotating adhering surfaces without shredding, tearing, abrading, or otherwise damaging the soft elastomeric material or brittle liner can be difficult, especially when the liner surfaces are rough and unfinished.

None of the current or alternative approaches eliminates the problems of reliable brittle liner sealing without risking damage to the liner and/or the seal. Even if the seal and liner edges are undamaged, the reliability of sealing at these lined joints may be less than desired.

SUMMARY OF THE INVENTION

A multi-piece seal has a slidable interface between pieces, and the seal is composed at least in part of a deformable and fluid resistant material at the joint interface. The slidable interface allows for rotational slippage of pieces during pipe joint assembly and disassembly, minimizing rotational stresses on the seal pieces and sealing surfaces, e.g., the ends of a brittle liner. The flexible material and geometry of the multi-piece seal allows significant seal deformation without sizable loads on the liner, resulting in a highly reliable seal at the liner joints.

At least one of the seal pieces may be attached to a liner edge for improved seal stability and reliability. One of the pieces may also be composed of glass or other relatively inert, electrically resistant and rigid material, e.g., a fluid resistant casting or end ring bonded to the brittle liner edge. The bonded end ring further limits stresses at the rotating liner edge sealing surfaces and distributes compressional loads.

BRIEF DESCRIPTION OF THE DRAWINGS

FIG. 2 shows a cross sectional view of a portion of an alternative lined pipe joint similar to that portion shown in FIG. 1b with end rings;

FIG. 3 shows a cross sectional view of a portion similar to that shown in FIG. 2 of another alternative lined pipe joint;

FIG. 4 shows a cross sectional view of a portion similar to that shown in FIG. 2 of still another alternative lined pipe joint; and FIG. 5 shows a cross sectional view of a portion similar to that shown in FIG. 2 of a three element seal in an alternative lined pipe joint.

In these Figures, it is to be understood that like reference numerals refer to like elements or features.

DESCRIPTION OF THE PREFERRED EMBODIMENT

Figure 1A:
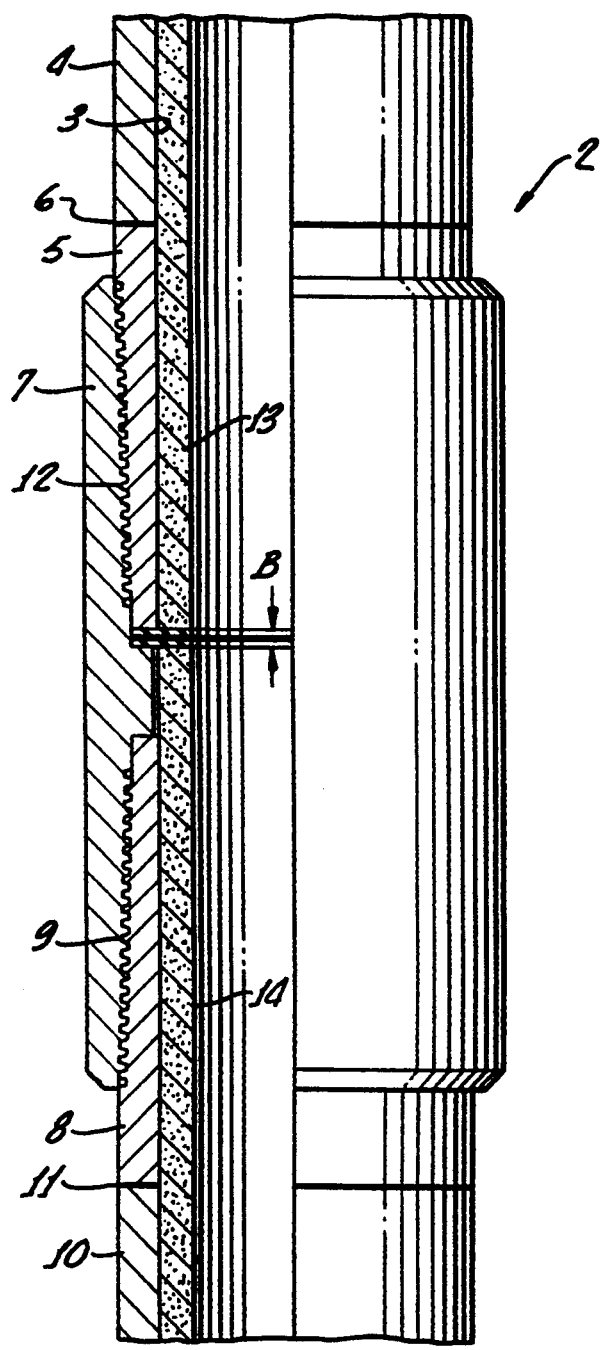
FIG. 1a shows a cross sectional and cut away view of a lined pipe joint having a dual-element sliding seal and FIG. 1b shows a cross sectional view of the seal portion of the lined pipe joint.

FIG. 1a shows a cross sectional and cut away view of an embodiment of a lined pipe connector apparatus 2.

An interior surface 3 of a relatively long first pipe section 4 forms an interior passageway having a centerline axis. The first pipe or duct section 4 is typically composed of a rigid structural material such as carbon steel. The first pipe section is welded at one end to a rigid pin or short first end segment 5 at a butt weldment 6. The end segment is typically composed of fluid resistant materials, such as high alloy steels. Attaching alternatives to butt weldment 6 include mating threads, adhesive, bolting, or pinned connections. The end segment 5 and pipe 4 form a pin end assembly which mates to a box end assembly.

The box end assembly includes a rigid second end segment 7, such as a ring-like pipe coupling or box end, attached to a third end segment 8 by threaded joint 9. For handling corrosive or other hard-to-handle fluids, the second end segment 7 is also composed of fluid resistant material such as high alloy steel. The third end segment 8 is attached to a second pipe section 10 by butt weldment 11 which is similar to butt weldment 6.

The long cylindrical pipe sections 4 & 10 are typically composed of conventional structural materials in order to minimize cost, and are covered by fluid resistant liners 13 & 14 to contain hard-to-handle fluids such as geothermal fluids. These pipe materials of construction are not resistant to corrosive or other attack by many hard-to-handle fluids. However, the short end segments 5 & 8 are composed of more costly structural materials resistant to these harsh fluids (such as high alloy steels) and this embodiment is not necessary recommended for cost-effective joints. The end segments 5 & 8 protect the ends of the pipe sections 4 & 10 and the brittle liners 13 & 14 protect the rest of the long carbon steel pipe or duct sections. The liner material for geothermal applications is typically a cast concrete or cement placed in the pipe as a slurry and spun around the pipe centerline into the shape of liner(s) 13 & 14. The liners once set are typically brittle, e.g., may only withstand a tensile stress of only about 100 psi, but is more typically capable of withstanding a tensile stress of 1,000 to 2,500 psi. The liner is typically capable of withstanding a compressive stress of 10,000 to 25,000 psi, i.e., ten times the tensile stress. In addition to full tensile failures, this material is also subject to microcracking, limiting compressive as well as tensile loading.

Figure 1B:
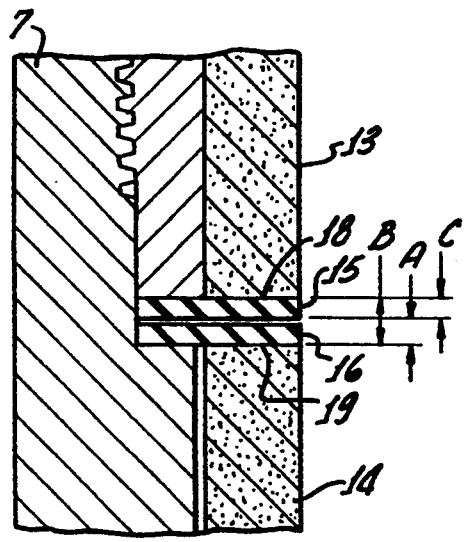

The brittle liner 13 is typically bonded or sealably attached to both the first pipe section 4 at the interior surface and the end segment 5. The first end segment 5 to first liner 13 bonding serves to attach and seal (or limit exposure of) the carbon steel pipe section 4 to the fluid flowing within any microannulus passageway of the first cylindrical liner 13. The liner-segment bond may also have to be fluid resistant unless the joint is also sealed at or near the exposed end surfaces at gap 17 (as shown in FIG. 1b). The liner end seal shown in gap 17 comprises gasket elements 15 & 16.

A second brittle liner 14 is similarly attached or bonded to both the second pipe section 10 and the third end segment 8. The bonding of second liner 14 again forms a fluid seal between the second liner 14 and the third end segment 8 preventing fluid from contacting the second pipe 10 (similar to the first end segment 5 and first liner 13 bonding).

The opposing end sealing surfaces 18 & 19 of the end segments 5 & 8 and/or liners 13 & 14 when mated or joined form a ring-like cavity or gap 17. The opposing surfaces 18 & 19 are shown generally planar and perpendicular to the centerline 14. Alternatively, the opposing surfaces 18 & 19 may form a ring-shaped cavity having a stepped, V-shaped, or other cross-sectional shape. If the point of the V-shaped (or similar) cross-section is pointed radially inward, this may help contain extrusion tendencies of a seal material during compression, but which may tend to unbond a liner from the pipe.

The brittle liners 13 & 14 are typically composed of an inert cementitious material, such as portland cement blended with silica flour or polymer concrete. The sealing surfaces 18 & 19 of a cementitious liner may be irregular or rough which can be difficult to seal with a deformable seal. Concrete surfaces may also be porous, making sealing with a deformable seal still more difficult. The radial thickness "D" of the cementitious liner (as shown in FIG. 5) is at least 0.32 cm ($\frac{1}{8}$ inch) in this embodiment as per American Petroleum Institute "Recommended Practice for Application of Cement Lining to Steel Tubular, Good, Handling, Installation and Joining" which is herein incorporated by reference. However, radial thickness "D" is a function of pipe size, liner materials, fluid properties, etc., and other thicknesses may be appropriate for different embodiments and applications.

A liner seal at the liner ends of a threaded, brittle-lined pipe joint to perform more effectively should form a fluid barrier, be fluid-resistant, be slidable as the threaded joint is rotated during assembly, be easily deformable to limit sealing loads on the brittle or fragile liners 13 & 14, and be somewhat resilient to accommodate fluctuations in gap width. A "fluid-resistant" material is defined, for the purposes of this invention, as a material able to withstand the corrosive, erosive or other deleterious effects of the flowing fluids within the pipe sections. Without the fluid-resistant liner seal, harsh fluids would attack the structural non-fluid-resistant material of the piping (e.g., if the liner unbonds).

But the cementitious portion of sealing surfaces 18 and 19 can have a rough surface finish as cast, making it a difficult-to-seal surface. Although the surface finish can be improved, e.g, by controlling aggregate size, sealing these rough and irregular surfaces presents problems. These rough surfaces can be sealed by the expanded graphite gaskets or other highly compressible materials, but if greater reliability is desired, the surfaces can be machined or otherwise trued and smoothed.

The multi-element liner end seal or gasket (composed of dual seal elements 15 & 16) is shown compressed by the liner and segment end surfaces 18 & 19 in FIG. 1a and contacting, but uncompressed by these surfaces in FIG. 1b. The end surfaces 18 and 19 are separated by a distance "A" when the liner seal is fully compressed and by distance "B" when just contacting the liner seal, but not compressing it. Compression is achieved by squeezing and rotating the threaded pipe sections 4 & 10 together. The space between the liner seal elements 15 & 16 is shown in FIG. 1b for clarity in identifying each seal element, but the liner seal elements would be contacting each other as well as the liner end surfaces 18 & 19 when the end surfaces are separated by distance "A" or "B."

The multi-element gasket (seal elements 15 & 16) is mostly composed of an expanded graphite material, but may also be composed of other deformable materials having at least partial resiliency after deformation and a minimum lubricity. The sealing loads developed by the deformed material are limited by compressing both seal elements only over a compressing distance equal to distance "C" which is equal to contact distance "B" (when seal is initially contacted) less final gap or distance after compression "A." The preferred compressing distance "C" is no more than about 35 to 40 percent of contacting distance (or original total thickness) "B" for flexible graphite gaskets in thick cement-type liners, but the compressing distance "C" can be a larger range for other applications. More typically, compression is at least about 20 percent. Compressing the expanded graphite gaskets 35 to 40 percent can typically result in axial strains of as much as $3000 \times 10^{-6}$ inch/inch, but may be a little as $200 \times 10^{-6}$ inch/inch. For a reduced (expanded graphite) compression, the strains are typically reduced from this range.

Each of the deformable liner seal elements 15 and 16 may be bonded or attached to the end surfaces 18 and 19, but bonding is not required in the preferred embodiment. Even if not bonded, the rough and porous surface of the liner ends 18 and 19 tends to mechanically adhere the deformable seal elements 15 and 16 to these contacting surfaces. The seal to liner adherence prevents or limits differential movement at these contacting surfaces when the pipe sections are threadably rotated to accomplish the desired compression and joint makeup.

Differential movement or sliding during threaded rotation is achieved at the seal element 15 to seal element 16 interface. Sliding capacity at this slidable interface can be enhanced by the application of lubricants, but the lubricity of the preferred graphite materials of construction allows compression and sliding without added lubrication. These materials of construction avoid the need for a fluid resistant lubricant and the risk of unwanted lubricant contamination of other fluid components.

The preferred liner seal material of construction is a flexible or expanded graphite, such as Calgraph ®, B grade, supplied by Pacific Mechanical, Inc. located in Santa Fe Springs, Calif., and Graphoil, supplied by Union Carbide Inc. Alternative materials of construction which would typically not require lubricant at the seal-to-seal sliding interface include: Teflon (for less elevated temperature applications), reinforced Teflon or Teflon coated elastomers, and nylon (for less hard-to-handle fluids). Other elastomer seal materials may a lubricant. Typical properties of the flexible graphite material are listed in Table 1.

TABLE 1

| TYPICAL PROPERTIES-EXPANDED/ FLEXIBLE GRAPHITE | | |
|---|---|---|
| PROPERTY | UNITS | VALUE |
| Resistivity | OHM-IN. parallel/ perpendicular to surface | 0.004/0.025 |
| Bulk Density | lb/FT$^3$ (gm/cc) | 70.0 (1.1) |
| Thermal Conductivity | BTU-in/hr-ft$^2$-°F. | 1532 |
| Thermal Expansion | 10$^{-6}$/°F. | 2.8–4.4 |
| Hardness | Shore Scleroscope | 30–40 |
| Tensile Strength | psi | 700 min |
| Permeability of Air | cm$^2$gm | <0.00001 |
| Emissivity at 932° F. | — | 0.4 |
| Sublimation Temp. | °F. | 6600 |
| Temp. Limit (in air) | °F. | 1000 |
| Coef. of Friction (against steel) | — | 0.05 |

More reliable sealing can be obtained from these graphite gaskets even where the tolerances on dimension "C" are large, the liner/pipe segment end surfaces are misaligned, the liner partially unbonded, and the liner end surface is very rough, e.g., conventionally as cast. This improved sealing reliability is primarily due to the large compressibility of the flexible graphite seal elements. As both of the seal elements are compressed, the large compressibility allows the graphite material to fill in rough liner end surfaces and unbonded spaces. The large compressibility also minimizes the adverse effects of a smaller area of sealing due to misalignment or reduced compression distance caused by dimensional tolerance variations. Although the compressibility of the deformable seal elements is theoretically unlimited, a minimum compressibility of at least about 20% while retaining a resilience or recovery of at least about 10% and a creep relaxation of no more than 5% is preferred. A greater compressibility (while limiting stress) of at least about 30% is more preferred. Still greater compressibility of at least about 40 to 60% is still more preferable, but may be difficult to obtain. More typically, a compression ranging from about 25 to 35 percent is expected for the preferred expanded graphite materials of construction.

The graphite's low permeability also assists in obtaining a reliable seal. Although the permeability of the deformable seal elements is theoretically unlimited, a minimum permeability of no more than that of the liner is acceptable (typically less than about 0.00001) is preferred, a permeability of no more than about 10 percent of the liner more preferred, and a permeability of no more than about 1 percent of the liner still more preferred.

Another important property of the liner end seal material (with or without lubricant) is its lubricity and-/or coefficient of friction against itself. Although the seal material coefficient of friction against itself is preferably no more than 0.3 without lubricant, more preferably limited to no more than 0.1 without lubricant, and still more preferably no more than about 0.05 without added lubricant, this property can typically range from as little as about 0.01 (with lubricant) to as much as about 0.7 (without lubricant). For seal elements having still higher static coefficient of friction (against itself) and or having a coefficient of friction against itself greater than against the sealing surface, the contacting (sealing) surfaces of the liner/piping may be roughened to increase friction at these contacting surfaces or even bonded, assuring slippage occurs between the seal elements 15 & 16.

In the preferred embodiment for geothermal applications, the liner and end seal must also be able to withstand scaling fluid temperatures of up to about 600° F. (316° C.), pressures of up to about 1200 psig (82.7 atmospheres), salinities of up to about 30 percent, fluid pH as low as about 2 and as high as about 8, and a fluid velocity up to about 200 feet per second or fps (60.96 meters per second). The liner seal must withstand these conditions without significant loss of resiliency, shrinkage, swelling, or long term degradation.

Each of the gaskets 37 & 38 may be formed using laminated ring construction. The plurality of layers may include an alloyed metallic layer imbedded in layers of flexible graphite or other deformable materials. The metallic layer provides a ring-like reinforcement of the graphite or other layers. The layered construction may provide multiple slidable interfaces if the layers are not bonded to each other.

In the embodiment shown in FIGS. 1a and 1b, the gaskets 15 and 16 also form a redundant fluid seal between the opposing surfaces of the metallic end segments as well as the liners. The squeezing by the metal segments also anchors the gaskets. This redundancy of sealing and anchoring further assures the reliability of sealing in a harsh environment. However, compression may be limited by the induced loads placed upon the brittle liner.

FIG. 2 shows a cross sectional view of an interface portion of an alternative embodiment connector apparatus similar to the view shown in FIG. 1b. The lined pin end 20 and lined box end 21 pipe sections are a similar configuration to the lined high alloy end segments shown in FIG. 1, but are composed of non-fluid resistant structural materials, such as steel or other conventional materials, requiring a primary seal at the mating liner end surfaces. A primary seal, as used herein, is a fluid barrier that is expected to function in the absence of other seals, whereas a secondary seal may not function in the absence of other seals, e.g., a joint gap filled with a putty (secondary seal) may be blown out upon loss of a primary seal at the joint. The interior or passageway 24 of the pin end 20 and box end 21 pipe sections have liners 22 and 23 which do not extend to entirely cover the interior passageway 24, i.e., the liner ends are setback to allow placement of end rings 35 and 36. Although the passageway 24 is shown extending in both pipe sections, the passageway may not be present in one or both portions of the joint, e.g, an end cap. If end rings 35 and 36 are not present, the setback of the liner end surfaces 25 & 26 prevents excessive (rotation and) compression of the dual element seal (15 & 16) between the liner end surfaces. However, the use of glass or other end rings 35 and 36 provides more suitable end surfaces to seal against and allows full compression if required. Thus, even if the opposing pipe end surfaces 27 & 28 are abutting, the set back of the liner end surfaces 25 & 26 allows placement of end rings and/or limits the liner end compression of the dual seal elements.

The dual element gasket 15 & 16 also anchors and forms a redundant seal at the metallic pin and box end surfaces 27 & 28, similar to that shown in FIG. 1a. Because the metal pipe can typically withstand much larger stresses and is no longer limited by the loads on the brittle liner, compression may be increased at the metallic interface, anchoring the seal and producing a more reliable liner seal.

FIG. 3 shows a cross sectional view of an interface portion of the preferred embodiment connector apparatus similar to the view shown in FIG. 2. The pin end 31 and box end 32 metal pipe sections are threadably attached similar to the pipe sections 20 & 21 shown in FIG. 2, but the pipe does not directly compress the gaskets 29 & 30. The interior pin end 31 and box end 32 pipe sections have liners 22a and 23a which do not extend to entirely cover the interior 24a of the pipe sections, similar to that shown in FIG. 2. The liner recess or setback from nose and shoulder of the pin and box ends respectively, again prevents excessive (rotational) compression of the dual element seal (29 & 30) even when the opposing pipe end surfaces 27a & 28a abut. Although the multi-element gasket seal is no longer anchored by pipe end compression, abutting pipes result in more repeatable and consistent compression. The dual seal elements 29 and 30 may also be attached to the liner end surfaces 25a & 26a, if anchoring is required. Alternatively, the joint could shoulder the seal at a different point and still trap the ring seals or gaskets between the nose and shoulder ends.

FIG. 4 shows a cross sectional view of an interface portion of a four element seal in another alternative embodiment connector apparatus. The pin end 31 and box end 32 pipe sections are threadably attached similar to the pipe sections shown in FIG. 3. The interfacing portions of the pin end 31 and box end 32 pipe sections have liners 22b and 23b which do not extend to entirely cover the interior 24a of the pipe sections. The liner end surfaces 25b & 26b are set back further than shown in FIG. 3 which allows end foils or end rings 35 & 36 to be bonded to the liner end surfaces 25b & 26b. A similar compression as a percent of the dual gaskets 33 & 34 can be achieved by the end rings 35 & 36, but a greater compression without liner damage may be possible because of the more even load distribution achieved by the end rings.

The end rings 35 & 36 also provide a finished or an otherwise smoother sealing surfaces contacting the dual sealing elements 33 & 34 when compared to the rough concrete liner end surfaces 25b & 26b. The end rings 35 & 36 are typically composed of a rigid, fluid-resistant material, such as glass polished high alloy steel if galvanic corrosion is not anticipated. Other processes to obtain the finished sealing surfaces on the end rings 35 & 36 include machining, rolling, and stamping.

The set back distance of the end rings 35 & 36 from the pipe end surfaces is selected to again prevent excessive compression of the dual element graphite seal (33 & 34). Thus, even when the opposing pipe end surfaces 27a & 28a abut, the set back of the liner end surfaces 25b & 26b and thin end rings 35 & 36 results in a predictable maximum % compression of the dual seal elements 33 & 34 having a given total thickness.

FIG. 5 shows a cross sectional view of an interface portion of a three element sealing element comprising dual deformable gaskets 37 & 38 and a landing ring 39. The deformable gaskets 37 & 38 (and gasket end ring in an alternative embodiment) are preferably contacting the landing ring 39, but these elements may also be spaced apart. The pin end 31a and box end 32a pipe sections are threadably attached similar to the pipe sections shown in FIG. 3. The internal surfaces 24a of the pin end 31a and box end 32a pipe sections have covering liners 22c and 23c which protrude or extend beyond the pipe section as well as entirely covering the interior passageway. For the thicker landing ring shown, the protrusion of the liner end surfaces 25c & 26c allows the pipe sections to contact and seat on the landing ring 39 while simultaneously compressing the dual deformable gasket elements 37 & 38. Other embodiments, e.g., using a landing ring thinner than the total thickness of the gaskets 37 & 38, may preferably have the liner end surfaces 25 & 26 set back while the pipe ends contact the thinner landing ring to achieve similar compression of the dual gaskets 37 & 38 without the risk of damage to a protruding brittle liner.

The landing ring 39 prevents excessive (rotational) compression of the dual element seal (37 & 38). When the pipe end surfaces abut the landing ring 39, the liner end surfaces 25c & 26c are compressed a known amount for a specific total thickness of the dual gaskets 37 & 38.

Several slidable interfaces may be present in this embodiment. When the pipe sections are rotated with respect to each other, the gasket-to-gasket and gasket-to-landing ring interfaces (if contacting) may slide against each other in the absence of the gasket-to-sealing surface sliding. Although landing ring sliding typically requires the landing ring to gasket contacting surface to be smooth, such as a glass or polished surface, the landing ring surface may be rougher if the liner end surfaces (or other landing ring surfaces) are unfinished.

A redundant seal may again be formed by the landing ring seal assembly shown. Although the ring joint lands provide for torque requirements, the landing ring 39 and dual gasket 37 and 38 may also redundantly seal at this interface. Thus, reliability of the seal is enhanced.

The nominal radial width "A" of the dual gaskets 37 & 38 (and liner in the embodiment shown in FIG. 5) is approximately ¾ inch (1.905 cm), but may typically range from about 1/32 to 1¼ inches (0.07938 to 3.175 cm). Although substantially equal gasket thicknesses are shown, the nominal axial thickness of each of the dual gaskets may range from about 1/32 to ⅛ inches (0.07938 to 0.3175 cm) resulting in a total axial thickness (prior to compression) of from about 1/16 to ¼ inches (0.1588 to 0.635 cm). The nominal landing ring radial width is approximately ⅛ inch (0.3175 cm). The nominal axial thickness of the landing ring is approximately 0.18 inches (0.4572 cm) for a ¼ inch total thickness gasket (⅛ inch each) at 30 percent compression.

The invention satisfies the need to provide sealed connectors which can structurally and environmentally withstand severe environments at minimal cost. The process of using these sealed connectors is to place a multi-element, internally sliding seal proximate to a liner end or other sealing surface and compress the seal using a mating joint element. When the mating joint element is rotated and compressed, the internal sliding seal design precludes sliding (and sliding damage) at the seal to liner end interfaces, e.g., when joint ends are threadably joined. In one embodiment, the seal elements are also compressed by opposing structural pipe surfaces to form a redundant pipe and liner seal which anchors the seal. The use of low cost threaded piping with a brittle liner and deformable seals, such as dual gaskets, achieves a reliable and low cost sealed joint. The joint, end rings, and seals may also be reusable.

An alternative process first places an expanded graphite gasket-like element at a cementitious (or other rough) liner end surface and compresses the gasket-like element, followed by removal of the compression load and replacement of the gasket-like element with a different seal. The use of a graphite gasket having a slidable interface for the gasket-like element avoids liner and other damage caused by compression and rotation.

The process step of compressing the expanded graphite (gasket-like element) by the rough liner end surface drives graphite into the crevices and recesses of the cementitious surface (i.e., leaves a graphite residue) which is not removed when the gasket-like element is removed. The residue in the recesses upgrades or improves the surface finish (e.g., reduces surface roughness) so that a conventional or other deformable seal which previously would not reliably seal the joint can now be compressed by these surfaces and achieve a reliable seal. If the graphite gasket-like element is compressed by a liner and carbon steel surface, similar to that shown in FIG. 2, the graphite may also tend to coat and protect the carbon steel surfaces against the corrosive effects of the hard-to-handle fluid. The graphite gasket-like element can also be reused for impregnating other liner or pipe sealing surfaces.

The impregnation not only provides a less rough surface, but provides an improved slipping surface, i.e., having a lower coefficient of friction. The impregnated liner end surface joints can be threadably rotated without damaging a new seal or brittle liner. The new seal may be a single gasket or other conventional seal.

Another advantage of some embodiments of the invention process and apparatus is avoiding the potential for galvanic corrosion. The high alloy end segments shown in FIGS. 1a & 1b may encourage galvanic corrosion at a weldment or other attachment to the carbon steel pipes. The embodiments which seal in the absence of the high alloy end segments or other dissimilar metals avoid the potential for galvanic corrosion.

The invention is further described by the following sample test data summarized in Table 2.

TABLE 2

SEAL COMPRESSION TEST DATA

| SEAL ARRANGEMENT | LUBE | RECESS | FINAL CONDITION |
|---|---|---|---|
| 2 × 1/32 Graphite | None | Flush | Crimpled at 60% |
| 2 × 1/16 Graphite | None | Flush | Crimpled at 47% |
| 2 × ⅛ Graphite | None | Flush | Opened at 50% |
| 2 × 1/32 Graphite | None | Flush | Rippled at 100% |
| 2 × 1/32 Graphite | None | Flush | Ripped at 100% |
| 2 × 1/16 Graphite | None | Flush | Good |
| 2 × 1/16 Graphite | None | Flush | Good |
| ¼" C-seal | Red | 0.160" | extruded at 20% |
| 3/16" C-seal | Red | 0.160" | left groove |
| 3/16" & 2 × 1/32 graphite | None | 0.160" | Springs crushed |
| 3/16" C-seal | Red | 0.160" | Springs crushed & cement failed |
| 3/16" C-seal | Red | 0.160" | — |
| Silicon | None | Flush | — |
| Silicon | None | Flush | 0.020 gap |

The data in Table 2 are illustrative of specific modes/tests of the compression boundaries of some embodiments of the invention and are not intended as limiting the scope of the invention as defined by the appended claims. The sample data were derived from testing of an instrumented 9⅝ inch nominal diameter, lined-pipe, threaded joint. The instrumentation recorded temperature, pressure, loads, strain, leakage, and a video record of gasket element motion during assembly and compression of some types of connectors and seal designs.

While the preferred embodiment of the invention has been shown and described, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A connector apparatus for containing a hard-to-handle fluid, the apparatus comprising:

a first pipe section substantially composed of a non-fluid resistant material and having an interior passageway;

a fluid-conducting liner substantially composed of a brittle fluid resistant material and substantially covering said interior passageway, the liner having a first sealing surface proximate to one end of said first pipe section;

a second pipe section having a second sealing surface which is substantially opposingly located from said first sealing surface when said pipe sections are joined;

a means for joining said pipe sections to produce compression of a deformable seal between said sealing surfaces and to produce rotation of the first pipe section relative to the second pipe section; and at least two deformable seal elements forming a deformable seal compressed between said sealing surfaces, said two compressed deformable seal elements slidably contacting each other at a slidable interface.

2. The apparatus of claim 1 wherein the means for joining comprises:

a threaded surface on said first pipe section;

a mating threaded surface on said second pipe section; and means for engaging said threaded surfaces and rotating said first pipe section with respect to said second pipe section.

3. The apparatus of claim 2 wherein said liner is composed of a brittle cementitious material and said seal elements are composed of flexible graphite.

4. The apparatus of claim 2 wherein said first sealing surface is formed in the absence of a machining process and said slidable interface also comprises a lubricant.

5. The apparatus of claim 4 wherein said brittle cementitious material is formed by casting and said first sealing surface has an as-cast surface finish.

6. A connector apparatus for containing a hard-to-handle fluid, the apparatus comprising:

a first pipe section substantially composed of a non-fluid resistant material and having an interior passageway;

a fluid-conducting liner substantially composed of a fluid resistant material and substantially covering said interior passageway, the liner having a first sealing surface proximate to one end of said first pipe section, wherein said liner is composed of a brittle cementitious material and said seal elements are composed of flexible graphite and wherein said first sealing surface is formed in the absence of a machining process and wherein said brittle cementitious material is formed by casting and said first sealing surface has an as-cast surface finish;

a second pipe section having a second sealing surface which is substantially opposingly located from said first sealing surface when said pipe sections are joined;

a means for joining said pipe sections to produce compression of a deformable seal between said sealing surfaces, wherein the means for joining comprises:

a threaded surface on said first pipe section;

a mating threaded surface on said second pipe section; and means for engaging said threaded surfaces and rotating said first pipe section with respect to said second pipe section; and at least two deformable seal elements forming a deformable seal compressed between said sealing surfaces, said elements slidably contacting each other at a slidable interface, wherein first and second sealing surfaces form a ring-shaped gap when said pipe sections are joined, said gap partially enclosing sealing elements having a thickness parallel to said passageway ranging from no less than about 0.1588 cm to no more than about 0.635 cm prior to being compressed by said sealing surfaces.

7. The apparatus of claim 6 wherein said ring shaped gap has a truncated V-shaped cross-section opening radially outward.

8. The apparatus of claim 6 wherein said means for joining compresses the thickness of said sealing elements an average of from 20 to 40 percent.

9. The apparatus of claim 8 wherein said first pipe section also comprises an end segment substantially composed of fluid-resistant rigid material attached to both said liner and said non-fluid resistant material.

10. The apparatus of claim 9 wherein the second pipe section comprises a substantially rigid second end segment attached to said second pipe section, the second segment having said second sealing surface.

11. The apparatus of claim 10 wherein said first segment also comprises a threaded surface capable of sealably mating with a threaded surface of said second segment.

12. The apparatus of claim 11 wherein said deformable seal is also compressed by a surface of said first end segment when said pipe sections are joined.

13. The apparatus of claim 12 wherein said deformable seal also comprises a rigid reinforcing layer.

14. The apparatus of claim 13 wherein said deformable seal also comprises a rigid landing ring substantially contacting said first end segment when said pipe sections are joined.

15. The apparatus of claim 14 wherein said liner has a representative thickness covering said passageway of at least 0.3175 cm.

16. The apparatus of claim 15 which also comprises a rigid end ring element at least partially covering the first sealing surface and said end ring element is composed of a fluid-resistant glass material.

17. The apparatus of claim 16 wherein said end ring element is attached to said liner.

18. The apparatus of claim 17 which also comprises a fluid resistant lubricant applied to said slidable interface.

19. A connector apparatus for containing a fluid, the apparatus comprising:

a duct having an interior passageway;

a brittle liner substantially covering said interior passageway, the liner having a first sealing surface;

a duct mating element having a second sealing surface which is substantially opposingly located from said first sealing surface when said duct is joined to said duct mating element;

a means for joining said duct and duct mating element while compressing a seal located between said sealing surfaces and while rotating the duct relative to the duct mating element; and at least two deformable seal elements compressed between said sealing surfaces, said two deformable seal elements slidably contacting each other at a slidable interface.

20. A method for sealably joining two duct-like sections, wherein each of said sections having generally opposing and spaced apart sealing surfaces when said ducts are joined, said method comprising:

placing at least two gaskets between said opposing sealing surfaces, wherein said gaskets contact each other at a slidable interface, wherein one of said gaskets is capable of rotating with respect to another gasket when said gaskets are squeezed together; and squeezing together and rotating one of said sealing surfaces with respect to the other sealing surface, wherein said squeezing and rotating compresses and slides at least one of said gaskets against another gasket at said slidable interface.

21. A method for sealably joining two duct-like sections, wherein each of said sections having opposing and spaced apart sealing surfaces when said ducts are joined, said method comprising:
    placing at least two gaskets between said opposing sealing surfaces, wherein said gaskets contact each other at a slidable interface; and
    squeezing together and rotating one of said sealing surfaces with respect to the other sealing surface, wherein said squeezing and rotating compresses and slides at least one of said gaskets against another gasket at said slidable interface, wherein said ducts are substantially composed of a structural material and a brittle liner, said gaskets have an average total thickness before said squeezing and rotating step of from about 0.07938 to 0.3175 cm, and wherein said squeezing and rotating step is accomplished in the absence of sliding at the interfaces between said gaskets and said sealing surfaces.

22. The method of claim 21 wherein said squeezing compresses the gaskets an average of about from 25 to 35 percent of said average total thickness.

23. The method of claim 22 which also comprises the steps of:
    releasing said gaskets from between said sealing surfaces;
    placing a deformable seal between said opposing sealing surfaces wherein a slidable interface between seal elements is absent from said deformable seal; and
    squeezing together and rotating one of said sealing surfaces with respect to the other sealing surface, wherein said squeezing and rotating compresses and slides said deformable seal against at least one of said sealing surfaces.

24. A method for sealably joining two duct-like sections, wherein each of said sections having generally opposing and spaced apart sealing surfaces when said ducts are joined, said method comprising:
    placing at least one deformable gasket and at least one rigid end ring between said opposing sealing surfaces, wherein said gasket and end ring contact each other at a lubricated slidable interface, wherein one of said gasket is capable of rotating with respect to said end ring when said gasket and said end ring are squeezed together; and
    squeezing together and rotating one of said sealing surfaces with respect to the other sealing surface, wherein said squeezing and rotating compresses and slides said gasket and end ring at said lubricated slidable interface.

* * * * *

UNITED STATES PATENT AND TRADEMARK OFFICE
CERTIFICATE OF CORRECTION

PATENT NO.   :   5,405,171
DATED        :   April 11, 1995
INVENTOR(S)  :   Allen et al.

It is certified that error appears in the above-identified patent and that said Letters Patent is hereby corrected as shown below:

On cover page, item [60] "Related U.S. Application Data, line 5, after Ser. No. 713,551, change "October 26, 1989" to -- June 7, 1991 --.

Column 11, claim 5, line 24, delete "4" and replace with -- 3 --.

Signed and Sealed this

Twenty-ninth Day of August, 1995

Attest:

BRUCE LEHMAN

Attesting Officer

Commissioner of Patents and Trademarks